UNITED STATES PATENT OFFICE 2,234,931

TREATMENT OF SUPERCOOLED SHORTENING

Roy C. Newton and Guy W. Phelps, Chicago, Ill., assignors to Industrial Patents Corporation, Chicago, Ill., a corporation of Delaware No Drawing. Application March 24, 1937, Serial No. 132,808

6 Claims. (Cl. 99—118)

This invention relates to treatment of shortening.

One of the objects of the invention is to provide a method for improving the texture of shortening.

Another object of the invention is to prevent shortening from setting up in a brittle condition such as results when certain types of shortening are chilled in a manner to improve creaming qualities.

Other objects of the invention will be pointed out in the description which follows.

This application is a continuation in part of our application Serial No. 104, entitled Treatment of supercooled shortening, filed January 2, 1935.

It is the usual practice in chilling lard and other shortening agents to pass the heated oil in the form of a thin film over the surface of a chilling roll internally cooled by brine or ammonia, converting the oil into such semi-solid condition as to permit pumping and packaging, in ordinary practice, the product setting up to a solid form almost immediately after packaging.

It has been proposed, for example, in United States Patent No. 1,911,222, to improve the creaming qualities of lard and other shortening products by modifying the crystalline structure of the solid fat.

Ordinary chilling in the case of some shortenings, as, for example, lard, causes such a crystalline structure as to impart poor creaming qualities to the shortening. The crystalline structure resulting from the method described and claimed in the patent to which reference already has been made imparts greatly improved creaming qualities to the shortening, that is, it renders the shortening capable of retaining a greater percentage of air or moisture in a finely divided state.

This is accomplished by what may be termed super-cooling the oil, that is, rapidly cooling the liquid fat by bringing it in contact with a cold medium for a time long enough to reduce the temperature below the normal congealing point but not long enough to permit any substantial crystallization while the product is in contact with the refrigerating medium and then permitting the liquid fat to set up, out of contact with the refrigerating medium. This treatment results in the rapid onset of the initial crystallization, the heat of crystallization rapidly raising the temperature of the supercooled product from the temperature to which it is supercooled in a liquid state to a temperature close to the normal congealing point, after which such further crystallization as takes place will occur slowly at approximately the normal congealing point. Solidification takes place very rapidly after removal from contact with the chilling medium in the case of such products as lard, causing a phenomenon which may be best described as brittleness, which later disappears when the product is softened by the heat of crystallization.

This brittleness, which is very pronounced in the case of some shortenings, is undesirable from a packaging and handling standpoint. The present invention contemplates a treatment which obviates this difficulty without in any way affecting the enhanced creaming qualities of shortening so treated.

In carrying out the present invention, the liquid or slushy shortening immediately upon being removed from contact with a chilling medium, is pumped under pressure through a length of pipe which subjects the shortening during crystallization to an attrition process and permits dissipation of the heat of crystallization which develops from the rapid crystallization which takes place after supercooled fat has been removed from contact with the refrigerating medium.

This treatment causes a gentle stirring action for some period of time during the early stages of the crystallization of the fat. Although the time involved is not long, approximately two minutes, the results accomplished are remarkable and the fat sets up entirely without the brittleness which would otherwise result. It will be seen that these results are accomplished without the use of expensive equipment for agitating or otherwise treating the product by the simple expedient of passing the product in a supercooled condition through a length of pipe.

The method of the present invention is applicable generally to processing plastic oleaginous comestibles, such as lard, hydrogenated cottonseed oil, margarine, butter substitutes, shortening compounds, plastic cream, vegetable oils and the like, and products so treated are found to have a fine desirable texture.

It will be seen, therefore, that the present invention provides a novel method of avoiding brittleness and producing a plastic shortening by pumping the liquid supercooled product through a relatively long pipe out of contact with the refrigerating means.

The invention may be successfully carried out in practice by pumping the supercooled shortening through a two inch pipe from one hundred twenty feet to one hundred sixty feet in length under a pressure of eight hundred pounds per square inch.

In practice, we prefer pressures of from two hundred pounds to twelve hundred pounds per square inch, depending upon the shortening and the size of pipe. The pipe should preferably be not less than one hundred twenty feet in length.

The improvement in the shortening thus secured may be tested by a dry creaming test in which a standard mixture of sugar and shortening is creamed and the specific gravity is determined at selected intervals, or by a wet creaming test in which a standard mixture of sugar, shortening and water is creamed and the specific gravity determined at selected intervals. It is found by these tests that the creaming is substantially improved when the supercooled product is thus subjected to attrition and the heat of crystallization dissipated.

It will be understood that the present invention in its broadest aspect is not limited to any particular size or shape of pipe, nor to any particular pressure or rate of travel of the supercooled product through the pipe.

It will be apparent that the degree of attrition and rate of dissipation of the heat of crystallization is dependent upon the area of the inner surface of the pipe to which the shortening is passed in relation to the quantity of shortening and degree of pressure, consequently, if a pipe of large diameter is used, a longer pipe will be necessary to secure substantially the same results.

It will be understood that claims hereto appended include within their scope equivalent sizes and lengths of pipe.

It will also be readily apparent that the present invention, in its broadest aspects, is not limited to the employment of a specific mechanical means for securing the desired results since the invention may be practiced by passing the supercooled shortening through an unrefrigerated confined zone in an unobstructed path, during which movement the product is subjected to attrition and the heat of crystallization dissipated, whereby the product rapidly sets up out of contact with the chilling medium.

We claim:

1. The method of treating supercooled plastic oleaginous comestibles which comprises passing the supercooled fluid comestibles through approximately one hundred sixty feet of two inch unrefrigerated pipe.

2. The method of treating supercooled shortening which comprises passing the supercooled fluid shortening through approximately one hundred sixty feet of two inch unrefrigerated pipe.

3. The method of treating supercooled plastic oleaginous comestibles which comprises passing the supercooled plastic comestibles through an unrefrigerated two inch pipe not less than one hundred twenty feet in length.

4. The method of treating supercooled plastic oleaginous comestibles which comprises subjecting the supercooled fluid comestibles to attrition and permitting the heat of crystallization to dissipate by passing the material through an unrefrigerated pipe capable of subjecting the material to attrition and dissipating the heat of crystallization equivalent to the attrition and dissipation of the heat of crystallization which would be secured in an unrefrigerated two inch pipe not less than one hundred twenty feet.

5. The method of treating supercooled shortening which comprises passing the supercooled fluid shortening through an unrefrigerated two inch pipe not less than one hundred twenty feet in length.

6. The method of treating supercooled shortening which comprises subjecting the supercooled fluid shortening to attrition and permitting the heat of crystallization to dissipate by passing the material through an unrefrigerated pipe capable of subjecting the material to attrition and dissipating the heat of crystallization equivalent to the attrition and dissipation of the heat of crystallization which would be secured in an unrefrigerated two inch pipe not less than one hundred twenty feet.

ROY C. NEWTON.
GUY W. PHELPS.